United States Patent
Warren

(10) Patent No.: US 10,408,373 B2
(45) Date of Patent: Sep. 10, 2019

(54) LARGE DIAMETER PIPE LINING AND REPAIR

(71) Applicant: Warren Environmental, Inc., Carver, MA (US)

(72) Inventor: Daniel Warren, Carver, MA (US)

(73) Assignee: WARREN ENVIRONMENTAL & COATING, LLC, Middleborough, MA (US)

(*) Notice: Subject to any disclaimer, the term of this patent is extended or adjusted under 35 U.S.C. 154(b) by 536 days.

(21) Appl. No.: 14/689,642

(22) Filed: Apr. 17, 2015

(65) Prior Publication Data

US 2016/0010779 A1 Jan. 14, 2016

Related U.S. Application Data

(60) Provisional application No. 61/980,888, filed on Apr. 17, 2014.

(51) Int. Cl.
*F16L 55/163* (2006.01)
*F16L 55/162* (2006.01)
(Continued)

(52) U.S. Cl.
CPC ........... *F16L 55/163* (2013.01); *B29C 63/20* (2013.01); *B29C 63/34* (2013.01);
(Continued)

(58) Field of Classification Search
CPC ....... F16L 55/165; F16L 55/1651–1654; F16L 55/1656; E03F 2003/065; E02D 29/125; B29C 63/64; B29C 70/68; B29C 73/04

USPC ........... 405/150.1, 154.1, 155, 184.1, 184.2; 138/97, 98; 156/94, 156, 285, 286, 287, 156/293; 264/36.17, 257, 269, 314, 516

See application file for complete search history.

(56) References Cited

U.S. PATENT DOCUMENTS

| | | |
|---|---|---|
| 4,009,063 A | 2/1977 | Wood |
| 4,350,548 A | 9/1982 | Zenbayashi et al. |
| | (Continued) | |

FOREIGN PATENT DOCUMENTS

| | | |
|---|---|---|
| EP | 0898052 A1 | 2/1999 |
| JP | 6323100 | 11/1994 |
| | (Continued) | |

*Primary Examiner* — Janine M Kreck
*Assistant Examiner* — Stacy N Lawson
(74) *Attorney, Agent, or Firm* — Barlow, Josephs & Holmes, LTD.

(57) ABSTRACT

A method for installing a liner in a large diameter pipeline. In accordance with the method, the interior surface of the pipeline to be repaired is prepared by removing excess debris and dirt. A repair composite is brought into the tunnel or pipeline in a dry state. Once the dry repair composite is laid out in the structure to be repaired the repair composite is folded out and saturated and wetted out with high pressure spray guns. The spray guns are employed within the structure and an appropriate resin material is applied as required to wet out the fiber material. A calibration bladder is inflated and holds the repair composite in place against the pipeline walls until the epoxy resin is fully cured. Once the process is complete, the bladder tube is retrieved out of the system leaving the repair composite as a stand-alone system.

15 Claims, 4 Drawing Sheets

(51) Int. Cl.
*B29C 63/34* (2006.01)
*F16L 55/165* (2006.01)
*F16L 55/18* (2006.01)
*B29C 63/20* (2006.01)
*B29C 63/18* (2006.01)

(52) U.S. Cl.
CPC ............ *F16L 55/1652* (2013.01); *F16L 55/18* (2013.01); *B29C 63/185* (2013.01)

(56) References Cited

U.S. PATENT DOCUMENTS

| | | | |
|---|---|---|---|
| 4,440,194 A | 4/1984 | Kinumoto et al. | |
| 4,448,742 A | 5/1984 | Kromrey | |
| 4,456,401 A * | 6/1984 | Williams | B29C 63/0021 138/97 |
| 4,602,974 A * | 7/1986 | Wood | B29C 63/36 118/408 |
| 4,695,188 A | 9/1987 | Pulkkinen | |
| 4,714,095 A | 12/1987 | Muller et al. | |
| 4,770,562 A | 9/1988 | Muller et al. | |
| 4,778,553 A | 10/1988 | Wood | |
| 4,836,715 A | 6/1989 | Wood | |
| 4,915,542 A | 4/1990 | Fernando | |
| 4,940,360 A | 7/1990 | Weholt | |
| 5,002,438 A | 3/1991 | Strong | |
| 5,044,405 A | 9/1991 | Driver et al. | |
| 5,049,003 A | 9/1991 | Barton | |
| 5,106,440 A * | 4/1992 | Tangeman | B29C 63/28 156/156 |
| 5,108,533 A | 4/1992 | Long, Jr. et al. | |
| 5,225,121 A * | 7/1993 | Yokoshima | F16L 55/1654 138/97 |
| 5,228,478 A | 7/1993 | Kleisle | |
| 5,280,811 A | 1/1994 | Catallo et al. | |
| 5,348,764 A * | 9/1994 | Yokoshima | F16L 55/1651 156/287 |
| 5,393,481 A | 2/1995 | Wood | |
| 5,409,561 A | 4/1995 | Wood | |
| 5,411,060 A | 5/1995 | Chandler | |
| 5,415,499 A | 5/1995 | Hyde-Smith et al. | |
| 5,439,319 A | 8/1995 | Flanagan et al. | |
| 5,470,178 A | 11/1995 | Weholt | |
| 5,477,887 A | 12/1995 | Catallo | |
| 5,480,260 A | 1/1996 | Shattuck et al. | |
| 5,495,922 A | 3/1996 | Booher | |
| 5,501,248 A * | 3/1996 | Kiest, Jr. | D04B 1/02 138/123 |
| 5,549,856 A * | 8/1996 | Yokoshima | F16L 55/1651 138/97 |
| 5,645,217 A | 7/1997 | Warren | |
| 5,653,555 A | 8/1997 | Catallo | |
| 5,656,117 A * | 8/1997 | Wood | B29C 63/343 138/97 |
| 5,680,885 A | 10/1997 | Catallo | |
| 5,706,861 A | 1/1998 | Wood et al. | |
| 5,725,328 A | 3/1998 | Schmager | |
| 5,762,450 A | 6/1998 | Schmager | |
| RE35,944 E | 11/1998 | Driver et al. | |
| 5,868,169 A | 2/1999 | Catallo | |
| 5,874,151 A * | 2/1999 | Cohee | A42B 3/06 156/93 |
| 5,876,645 A | 3/1999 | Johnson | |
| 5,879,501 A | 3/1999 | Livingston | |
| 5,993,581 A | 11/1999 | Toyoda et al. | |
| 6,001,212 A | 12/1999 | Polivka et al. | |
| 6,056,017 A | 5/2000 | Kamiyama et al. | |
| 6,117,507 A | 9/2000 | Smith | |
| 6,167,913 B1 | 1/2001 | Wood et al. | |
| 6,311,730 B2 * | 11/2001 | Penza | 138/114 |
| 6,354,330 B1 | 3/2002 | Wood | |
| 6,402,427 B1 | 6/2002 | James | |
| 6,539,979 B1 | 4/2003 | Driver | |
| 6,663,016 B2 | 12/2003 | Bien | |
| 6,703,091 B1 | 3/2004 | Walker | |
| 6,708,729 B1 | 3/2004 | Smith | |
| 6,761,504 B1 | 7/2004 | Brandenberger et al. | |
| 6,820,653 B1 | 11/2004 | Schempf et al. | |
| 6,837,273 B2 | 1/2005 | Woolstencroft et al. | |
| 6,868,870 B2 | 3/2005 | Warren | |
| 6,923,217 B2 | 8/2005 | Smith | |
| 6,932,116 B2 | 8/2005 | Smith et al. | |
| 6,955,502 B2 | 10/2005 | Warren | |
| 7,096,890 B2 | 8/2006 | Woolstencroft et al. | |
| 7,270,150 B2 | 9/2007 | Warren | |
| 7,857,932 B1 | 12/2010 | Driver et al. | |
| 8,591,695 B2 | 11/2013 | Warren | |
| 2002/0058121 A1 | 5/2002 | Mercier | |
| 2002/0124898 A1 | 9/2002 | Renaud et al. | |
| 2005/0161100 A1 | 7/2005 | Pleydon et al. | |
| 2006/0278290 A1* | 12/2006 | Warren | F16L 55/1654 138/98 |
| 2007/0113971 A1 | 5/2007 | Driver et al. | |
| 2008/0204008 A1 | 8/2008 | Paulson | |
| 2010/0295198 A1 | 11/2010 | Kiest, Jr. | |
| 2012/0172507 A1 | 7/2012 | Weisenberg et al. | |
| 2012/0193011 A1 | 8/2012 | D'Hulster et al. | |
| 2013/0098535 A1 | 4/2013 | Kiest, Jr. | |

FOREIGN PATENT DOCUMENTS

| | | |
|---|---|---|
| WO | 9313350 A1 | 7/1993 |
| WO | 9708487 A1 | 3/1997 |
| WO | 9854509 A1 | 12/1998 |
| WO | 9905085 A1 | 2/1999 |
| WO | 2008089167 A1 | 7/2008 |
| WO | 2014197654 A2 | 12/2014 |

* cited by examiner

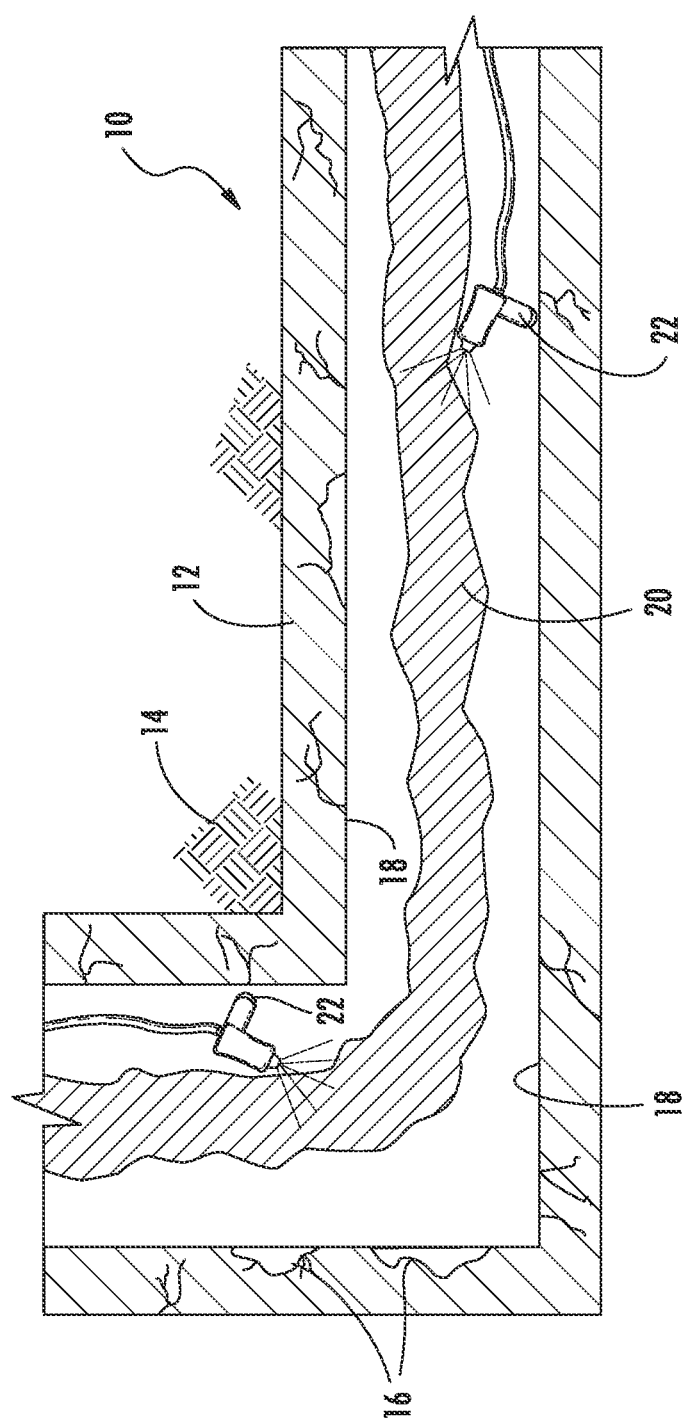

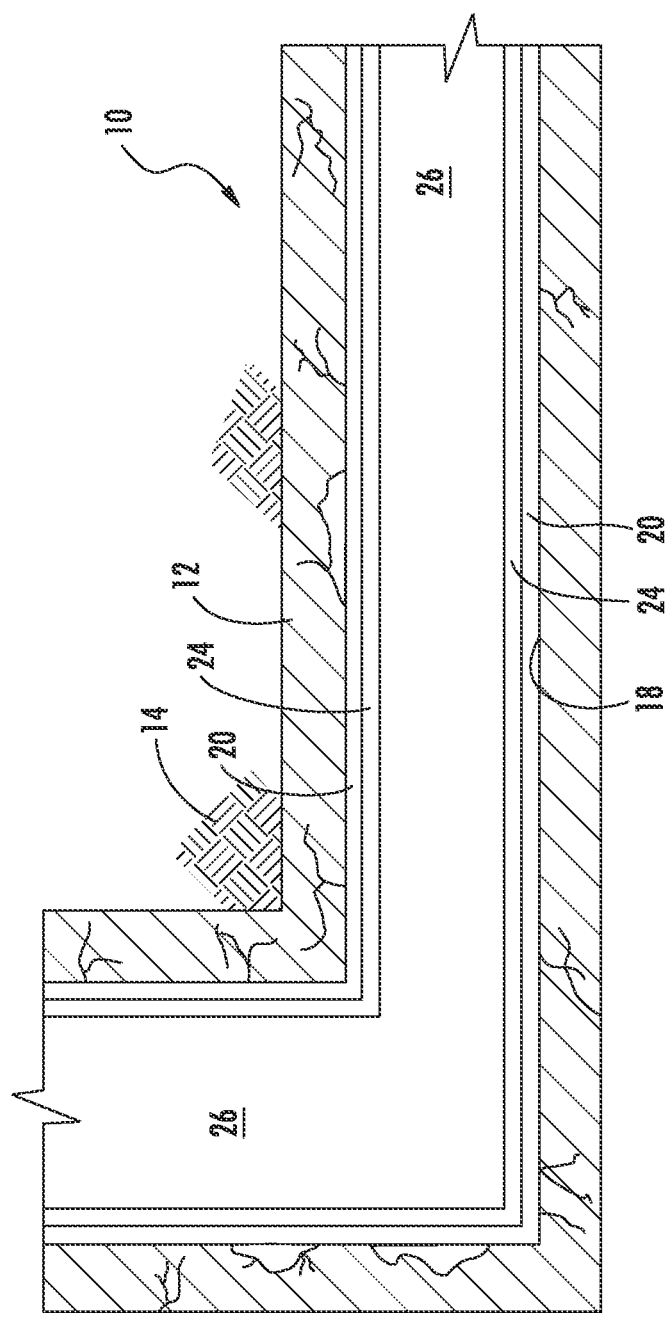

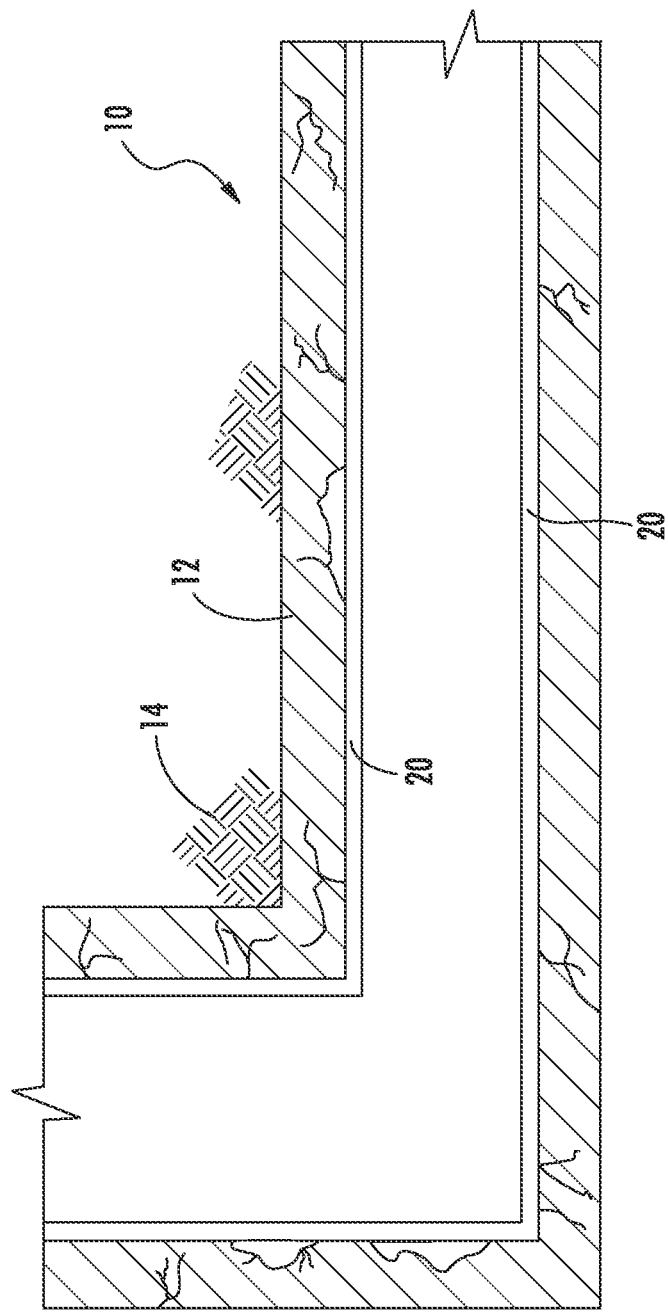

LARGE DIAMETER PIPE LINING AND REPAIR

CROSS-REFERENCE TO RELATED APPLICATIONS

This application is related to and claims priority from earlier filed U.S. Provisional Patent Application No. 61/980,888, filed Apr. 17, 2014.

BACKGROUND OF THE INVENTION

The present invention relates generally to a method and system for evaluating and repairing a distressed pipeline by installing a liner and a coating on the inside of the pipeline. More specifically, the present invention relates to a process wherein a dry liner is placed into a pipeline. Then, in a two part process, the liner is wetted out with epoxy resin in the pipeline and then a bladder slowly pressurizes the liner to bed it against the pipeline wall for curing.

Throughout developed parts of the world, there are numerous pipeline conduits that run underground in order to provide utility services to businesses and residences. These utilities include water lines, sewer pipes, storm water drains, and the like. Since these pipelines are installed underground, they are constantly subjected to numerous environmental pressured that cause the pipeline to deteriorate. For example, the pipeline may deteriorate due to ordinary aging, corrosive action of the fluids being transported in the line, environmental conditions such as groundwater exposure, or other reasons. Over time, all of the wear factors that impact on the pipeline result in holes, cracks, structural breakdown and other defects in the line that must be repaired in order to prevent fluid leakage and pipeline collapse problems.

In some instances, the concern is that foreign matter, which is initially part of the actual construction of the pipeline, may begin to flake off of the interior surfaces of the damaged pipeline and enter the fluid flow within the pipeline. For example, ductile iron piping has a clay liner surface that upon failure may allow rust to enter the fluid flow. Similarly, transite pipes that contain asbestos reinforcing fibers may release asbestos into the drinking water contained therein as the wall of the pipe begins to deteriorate. Finally, the potential exists for the introduction of substances that flow from the surrounding underground environment into the pipeline or for the water that is being carried through the pipeline conduit to flow outwardly through the cracks leading to a loss of water pressure and other problems.

Further, the wall materials of the pipeline itself may breakdown and deteriorate from the outside in. As the materials breakdown, corrode or otherwise wear the strength of the wall itself is compromised. Should the walls deteriorate significantly, the pipeline is at risk of failure.

The traditional approach to repairing the above-identified issues entailed digging up the effected pipeline and replacing it. Given the millions of miles of installed pipeline in the United States alone, this solution would be prohibitively expensive. Further, such pipelines are typically located beneath streets and right of ways where digging would create traffic flow problems and require extensive repaving of roadways as the replacement process was completed. In the case where transite pipelines must be repaired, an additional issue regarding the need to dispose of large quantities of asbestos waste must be addressed.

In an attempt to overcome many of these problems related to the traditional digging methods, a number of methods for renovating existing underground pipelines have been developed. Many of these methods employ the installation of a lining on the interior of the damaged pipeline using a lining hose and a calibration hose. For example, U.S. Pat. No. 4,714,095 (Müller) discloses a method of salvaging an underground sewer pipe with a lining hose and calibrating hose. The lining hose includes an inner layer, which is treated with a first resin, and an outer layer, which is not treated with a resin. The lining hose is placed into the pipe conduit. A surface region of a calibrating hose, which will contact the inner layer of the lining hose, is coated with a second resin. Then, the calibrating hose is introduced into the lining hose. The resins harden so that the lining hose becomes attached to contact surfaces of the calibration hose.

U.S. Pat. No. 4,770,562 (Müller) discloses another method of salvaging an underground pipe conduit. A lining hose having an inner layer that is saturated with a resin is used. The lining hose includes an outer layer, which is perforated to form flow-through openings for the resin of the inner layer. The lining hose is introduced into the pipe conduit. Then, the lining hose is shaped to conform to the pipe by introducing an auxiliary hose into the lining hose and injecting fluid into the auxiliary hose. The resins harden to form a lining structure in the pipeline. After the curing step, the auxiliary hose can be kept in the lining hose or it can be removed using ropes or cables.

U.S. Pat. No. 5,653,555 (Catallo) discloses a method of lining a pipe conduit using multiple curing resins. A lining hose, which is coated with a high-strength resin, is first positioned inside of the conduit. The lining hose is then expanded into contact with the inside surface of the conduit by inverting a calibration hose. The calibration hose has a layer of corrosion-resistant resin. The high-strength and corrosion-resistant resin layers are cured by the application of a heated fluid. The cured lining hose and calibration hose form a rigid self-supporting structure. The calibration hose is not removed from the liner.

U.S. Pat. No. 5,680,885 (Catallo) discloses a method of rehabilitating a damaged pipe conduit using a lining hose and calibration hose. The inner layer of the lining hose is soaked with an excess volume of resin. The calibration hose contains a resin-absorbent layer. The calibration hose is placed in the lining hose and inverted by the application of heated water. After inversion, the resin-absorbent layer of the calibration hose contacts and adheres to the resin-coated layer of the lining hose. Upon curing, the calibration hose becomes an integral part of the liner.

U.S. Pat. No. 5,706,861 (Wood) discloses a method of lining a section of a pipeline by a "cured in place" system using a lining tube and inflatable bladder. The lining tube is impregnated with a curable synthetic resin and carried into the pipe conduit on an annular inflatable bladder. The bladder is inflated and the lining tube is cured to the pipeline. Then, the bladder is peeled away from the cured lining tube and removed from the pipe conduit by ropes.

Although the above-described conventional methods may be somewhat effective in repairing pipelines, they still suffer from various problems. For example, problems arise concerning the inversion of a felt liner because it is relatively delicate and tends to break or rip during the inversion process. Also, pulling prior art liner tubes around corners is very difficult resulting in fractures in the sealing at such joints. Also, the pipeline joints found at corners and periodically along the length of the pipeline forms voids that cannot be completely filled by the prior art methods. Thus, the prior art methods can do nothing to improve the strength of the pipeline at its joints. Another difficulty is that once a liner has been installed, the identification of lateral supply pipe branches are difficult to identify and clear.

Further, none of the methods above provide for a real-time analysis of the condition of the pipeline. While these systems place a liner in the pile, they do not make a determination relating to the interior surface condition or structural wall condition of the pipeline. As a result the lining process simply takes a one size fits all approach that may not actually address the issues with the pipeline. Further, the approach may result in too much or too little material being added to the pipeline relative to the pipeline condition.

In view of the foregoing, there is a desire for a structural lining process that effectively seals all of the leaks and cracks within a pipeline. It is also desirable to provide a lining process that preserves structural integrity of the liners throughout the length of the pipeline, including tight bend and turn locations within the pipeline. It is also desirable to improve the adhesion between the lining hose inside of the pipeline and the interior walls of the pipeline to ensure integrity of the liner for a permanent installation that does not need periodic repair.

BRIEF SUMMARY OF THE INVENTION

In this regard, the present invention provides a method for installing a liner in a large diameter pipeline. Installing such a liner enables a damaged pipeline to be repaired and salvaged and placed in a condition for normal use. In accordance with the method of the present invention, the interior surface of the pipeline to be repaired and salvaged is first prepared by removing excess debris and dirt. The preparation is preferably performed with the appropriate surface preparation material based on the pipe material and condition.

Next a repair composite is brought into the tunnel or pipeline in a dry state. The repair composite is preferably a biaxial weave of carbon fiber, S glass, E glass, Kevlar or combinations thereof. The weave is braided and woven onto a circle or sewn to make a circular liner tube.

The dry repair composite further includes a plastic, rubber or neoprene bladder positioned within the center of the repair composite. Once the dry repair composite is laid out in the structure to be repaired the repair composite is folded out and saturated and wetted out with high pressure spray guns. The spray guns are employed within the structure and an appropriate resin material is applied as required to wet out the fiber material.

After the wet out of the repair composite is completed, the bladder is inflated. The bladder in this manner fully beds the repair composite against the walls of the structure to be repaired. Further the bladder holds the repair composite in place until the epoxy resin is fully cured. It is important to limit the pressure used of the initial inversion so as not to further damage fragile piping systems. The internal pressure in the bladder system will support the damaged pipe and force any excess resin through open pipe joints, cracks and bridge areas of the missing host pipe.

Once the process is complete, the bladder tube will be retrieved out of the system leaving the repair composite as a stand-alone system.

A new pipe within a pipe is thereby created by using potable water approved resins that can be cured under water with strong adhesion properties to wet under water substrates combined with woven structural fabrics such as carbon fiber and S glass structural fiberglass woven together. This process will make the host significantly stronger than it was when it was new, and stronger than any new pipe line product other than stainless steel or carbon steel pipe. The infusion liner will completely protect the water flowing within the pipe from free release into the water flow of any asbestos, lead PBCs or PVCs, and any surface ground water pollutants that may have previously entered through open pipe joints, cracks or breaks caused by the venturi effect of flowing water.

This invention eliminates the need for wet out facilities, over the road transport of materials, and the need for steam or boiler trucks.

Therefore, it is an object of the present invention to provide a new and novel process for lining the interior surface of a pipeline to repair and salvage the pipe so that is can be used normally in a leak-free condition. It is another object of the invention to provide a structural lining process that effectively seals all cracks and faults in an existing pipeline. A further object of the invention is to provide a structural lining process that installs a sealing inner liner that is well suited to seal corner joints within a pipeline. A further object of the present invention is to provide a structural lining process that relatively inexpensive to carry out compared to prior art processes without sacrificing the integrity of the sealing and repair accomplished by the process of the present invention.

These together with other objects of the invention, along with various features of novelty that characterize the invention, are pointed out with particularity in the disclosure and drawing annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention:

FIG. 2 is a cross-sectional view of the piping system with a repair composite placed therein;

FIG. 3 is a cross-sectional view of the piping system with the repair composite inflated by a calibration hose; and FIG. 4 is a cross-sectional view of the piping system with the completed repair composite liner therein.

DETAILED DESCRIPTION OF THE INVENTION

Figure 1:
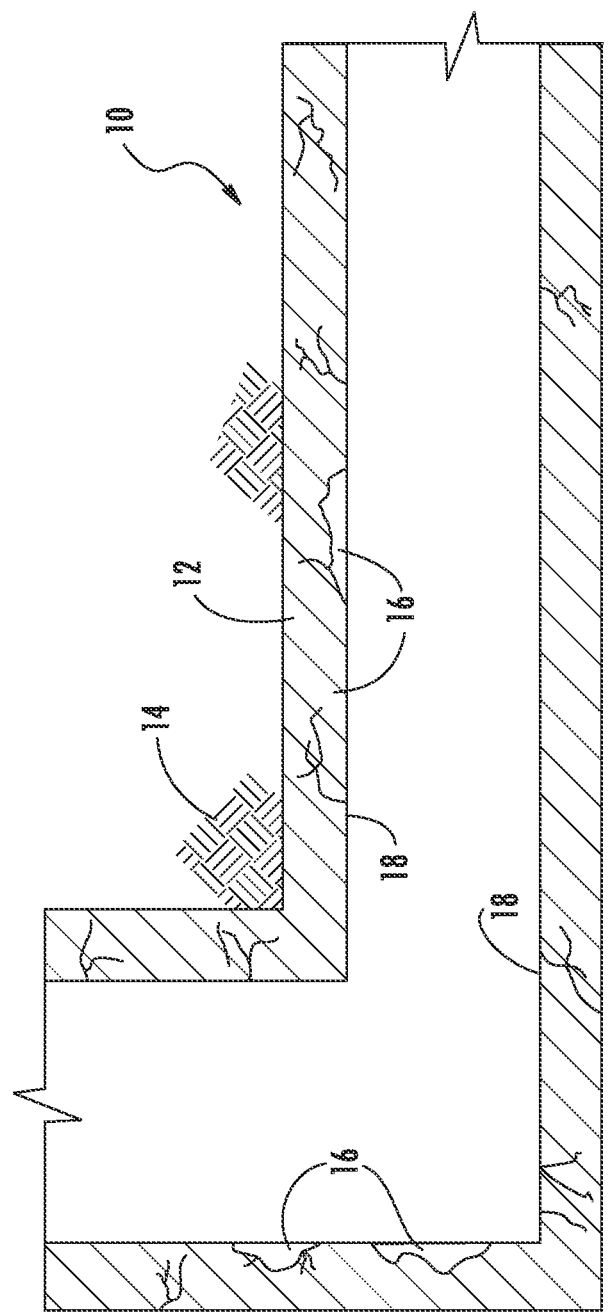
FIG. 1 is a cross-sectional view of a damaged piping system.

Now referring to the drawings, the method and system for repairing a large diameter pipeline in accordance with the teachings of the present invention is shown and generally illustrated in the figures. The method of the present invention involves the steps of cleaning the interior surface of the pipeline to be repaired, bringing a dry repair composite into the conduit, wetting out the repair composite within the pipeline structure to be repaired and inflating a bladder within the repair composite to press the repair composite into contact with the interior walls of the structure to be repaired.

Referring first to FIG. 1, a side cross-section view of a typical pipeline 10 installation is shown. The pipeline 12 or host pipe is installed in the ground 14. The pipeline 12 has a number of cracks 16 representing undesirable leaks and potential structural weaknesses. A common pipeline, as shown in FIG. 1, is typically made of concrete. Foreign matter, such as dirt, accumulates on the inner wall surfaces over time. The debris (not shown) forms hard scale deposits on the wall surfaces which can be difficult to remove. Also, degradation of the pipeline over time causes bits of the pipeline to break off, a process that is exacerbated by cracks therein.

In accordance with the process of the present invention, the inside surface 18 of the pipeline 12 to be repaired is preferably first prepared to remove the aforementioned debris and dirt to ensure a good bond. Preferably, the inner wall surfaces of pipeline are cleaned by injecting highly pressurized water into the pipeline. The pressurized water stream strikes the inside walls forcefully and scrubs the walls. For example, the water is provided at up 30,000 psi to ensure a clean surface. Even higher pressure can be used, if necessary. Known water spraying devices are used for this step of the process. The injected water substantially removes the foreign debris to leave a clean inner wall surface remaining. While high-pressure water is preferably used, air or steam may be used instead. Also, additional cleaning agents are not preferably used but such cleaning agents could be added to the water, air or steam to assist in cleaning depending the application and environment. After surface cleaning is complete, any standing water left remaining, such as that on the bottom of the pipeline, must now be removed. High pressure air, using known air blowing equipment, is injected into the pipeline to clear it of any remaining cleaning media.

Next a repair composite 20 is brought into the tunnel or pipeline in a dry state. The repair composite 20 is preferably a biaxial weave of carbon fiber, S glass, E glass, Kevlar or combinations thereof. The weave is braided and woven onto a circle or sewn to make a circular liner tube.

The dry repair composite 20 further includes a plastic, rubber or neoprene bladder positioned within the center of the repair composite. The repair composite 20 is inserted into the pipeline 12 by techniques known in the industry. The repair composite may be pulled or dragged into the pipeline in a collapsed state using a cable and winch-operating system (not shown). Further, the repair composite may be folded and rolled onto spools that are unrolled within the structure. In any case, the repair composite is introduced directly into the pipeline so that it rests on the bottom surface of the pipeline. While it is preferred that the repair composite is dragged or unrolled into the pipeline to be repaired, it is also possible to invert the repair composite into the pipeline.

Once the dry repair composite 20 is laid out in the structure to be repaired the repair composite is folded and laid out on the bottom of the pipeline 12. The repair composite 20 is then saturated and wetted out with high pressure spray guns 22. The spray guns are employed within the structure and an appropriate resin material is applied as required to wet out the fiber material.

After the wet out of the repair composite is completed, a calibration hose 24 positioned internally within the repair composite 20 is inflated. The calibration hose 24 in this manner fully beds the repair composite 20 against the inner surface 18 walls of the structure to be repaired. The calibration hose 24 is slowly filled with a pressurized fluid 26. It is important to limit the pressure used of the initial inversion so as not to further damage fragile piping systems.

Typically, water is used as the pressurized fluid by air or steam may be used. In one embodiment for introducing the calibration hose into the repair composite, a known inversion technique is used. As the pressurized fluid is directed into the calibration hose it inverts and walks along the inside of the repair composite and expands and presses the repair composite against the inner wall of the pipeline.

The use of pressurized water (not shown) to invert the calibration hose has several benefits. Particularly, the calibration hose is filled with water gradually so that the calibration hose walks through the pipeline. As the calibration hose is fed into the repair composite, it can easily travel along the turns of the pipeline. The pressurized fluid makes the inverted calibration hose push against the repair composite and forces it outwardly so that it presses against and engages the interior walls of the pipeline. As a result, the repair composite contacts and conforms to the shape of the internal pipeline walls. Further the calibration hose holds the repair composite in place until the epoxy resin is fully cured. The internal pressure in the bladder system will support the damaged pipe and force any excess resin through open pipe joints, cracks and bridge areas of the missing host pipe.

Once the process is complete and the resin is cured, the calibration hose 26 is deflated and retrieved out of the system leaving the repair composite 20 as a stand-alone system.

A new pipe within a pipe is thereby created by using potable water approved resins that can be cured under water with strong adhesion properties to wet under water substrates combined with woven structural fabrics such as carbon fiber and S glass structural fiberglass woven together. This process will make the host significantly stronger than it was when it was new, and stronger than any new pipe line product other than stainless steel or carbon steel pipe. The infusion liner will completely protect the water flowing within the pipe from free release into the water flow of any asbestos, lead PBCs or PVCs, and any surface ground water pollutants that may have previously entered through open pipe joints, cracks or breaks caused by the venturi effect of flowing water.

Many different types of curable resins can be used for wetting out the repair composite. Preferably the quick setting resin is or a moisture curing type and contains a light colored pigment agent. The thermosetting resin should have good adhesive strength and have high strength (for example, high flex modulus, flex strength, tensile modulus, and tensile strength properties.) Slow-curing resins may be used. For example, polyesters; vinyl esters such as urethane-based vinyl esters, and bisphenol A-fumarate based vinyl esters; and epoxy resins can be used. Epoxy resins are particularly preferred. For example, the assignee of the present invention employs an epoxy product under the product number S301 for resin and an epoxy product under the product number T301 for resin. The resin is spray applied to the repair composite in an uncured, liquid form.

It can therefore be seen that the present invention provides a new and novel process for lining the interior surface of a pipeline to repair and salvage the pipe so that is can be used normally in a leak-free condition. The present invention further provides a structural lining process that effectively seals all cracks and faults in an existing pipeline that is well suited to seal corner joints within a pipeline. Still further, the present invention provides a structural lining process that relatively inexpensive to carry out compared to prior art processes without sacrificing the integrity of the sealing and repair accomplished by the process of the present invention. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A method for installing a liner in an underground pipeline, having an interior surface, comprising the steps of:
   placing a repair composite, in a dry, collapsed state into the pipeline;
   wetting out said repair composite by spray applying a resin to repair composite in said collapsed state within said pipeline;
   introducing pressurized fluid into a calibration hose positioned within said repair composite after said repair composite has been fully wetted out;
   pressing the repair composite against the interior surface of the pipeline so that the repair composite bonds to the interior surface of the pipeline; and
   removing the calibration hose from the repair composite.

2. The method of claim 1, wherein the repair composite is a circular tube formed from a woven fiber.

3. The method of claim 1, wherein the repair composite is a circular tube formed from a biaxial weave of a fiber selected from the group consisting of: carbon fiber, S glass, E glass, Kevlar and combinations thereof.

4. The method of claim 1, wherein the step of pressing the repair composite against the interior surface includes inverting the calibration hose into the repair composite.

5. The method of claim 1, wherein the pressurized fluid introduced into the calibration hose is water.

6. The method of claim 1, wherein the pressurized fluid introduced into the calibration hose is air.

7. The method of claim 1, wherein the pressurized fluid introduced into the calibration hose is steam.

8. The method of claim 1, further comprising the step of:
   maintaining pressurized fluid in the calibration hose until said resin is cured.

9. The method of claim 1, further comprising the step of:
   cleaning the interior surface of said pipeline with water.

10. The method of claim 1, further comprising the step of:
    cleaning the interior surface of said pipeline with air.

11. The method of claim 1, further comprising the step of:
    cleaning the interior surface of said pipeline with steam.

12. A method for installing a liner in an underground pipeline having an interior surface, comprising the steps of:
    placing a repair composite, in a dry, collapsed state into the pipeline;
    spray applying a resin to said repair composite in said collapsed state to fully wet out said repair composite within said pipeline;
    introducing pressurized fluid into a calibration hose positioned within said repair composite after said repair composite has been fully wetted out;
    pressing the repair composite against the interior surface of the pipeline so that the repair composite bonds to the interior surface of the pipeline; and
    removing the calibration hose from the repair composite.

13. The method of claim 12, wherein the repair composite is a circular tube formed from a woven fiber.

14. The method of claim 12, wherein the repair composite is a circular tube formed from a biaxial weave of a fiber selected from the group consisting of: carbon fiber, S glass, E glass, Kevlar and combinations thereof.

15. The method of claim 12, wherein the resin is a slow cure, NSF epoxy.

* * * * *